United States Patent
Hu et al.

(10) Patent No.: US 11,074,519 B2
(45) Date of Patent: Jul. 27, 2021

(54) QUANTUM ALGORITHM CONCATENATION

(71) Applicant: International Business Machines Corporation, Armonk, NY (US)

(72) Inventors: Shaohan Hu, Yorktown Heights, NY (US); Antonio Mezzacapo, Westchester, NY (US); Marco Pistoia, Amawalk, NY (US); Peng Liu, Yorktown Heights, NY (US); Richard Chen, Mount Kisco, NY (US); Stephen Wood, Thornwood, NY (US); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 386 days.

(21) Appl. No.: 16/137,215

(22) Filed: Sep. 20, 2018

(65) Prior Publication Data
US 2020/0097859 A1   Mar. 26, 2020

(51) Int. Cl.
*G06N 5/04* (2006.01)
*G06N 10/00* (2019.01)
*G06F 9/30* (2018.01)

(52) U.S. Cl.
CPC .......... *G06N 10/00* (2019.01); *G06F 9/3001* (2013.01)

(58) Field of Classification Search
CPC .............................. G06N 10/00; G06F 9/2001
USPC ........................................................ 706/45
See application file for complete search history.

(56) References Cited

U.S. PATENT DOCUMENTS

| | | | |
|---|---|---|---|
| 7,383,235 B1 * | 6/2008 | Ulyanov | B82Y 10/00 706/13 |
| 9,663,358 B1 * | 5/2017 | Cory | G06F 7/38 |
| 10,248,491 B1 * | 4/2019 | Zeng | G06N 10/00 |
| 10,325,218 B1 * | 6/2019 | Zeng | G01R 31/3177 |
| 10,831,455 B2 * | 11/2020 | Gambetta | G06F 9/54 |
| 10,846,366 B1 * | 11/2020 | Otterbach | G06F 17/17 |
| 2006/0224547 A1 | 10/2006 | Ulyanov et al. | |

(Continued)

FOREIGN PATENT DOCUMENTS

WO   2008151427 A1   12/2008

OTHER PUBLICATIONS

Huang et al, "Performing Homomorphic Encryption Experiments on IBM's Cloud Quantum Computing Platform", Nov. 2016, IBM Technical paper, pp. 1-5 (Year: 2016).*

(Continued)

*Primary Examiner* — Viet Q Nguyen
(74) *Attorney, Agent, or Firm* — Amin, Turocy & Watson, LLP

(57) ABSTRACT

Techniques regarding quantum algorithm concatenation are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a concatenation component, operatively coupled to the processor, that can concatenate a first quantum algorithm and a second quantum algorithm by using an output of the first quantum algorithm as an initial parameter in the second quantum algorithm.

20 Claims, 10 Drawing Sheets

(56) References Cited

U.S. PATENT DOCUMENTS

| | | | |
|---|---|---|---|
| 2008/0140749 A1* | 6/2008 | Amato | B82Y 10/00 |
| | | | 708/490 |
| 2012/0254586 A1* | 10/2012 | Amin | G06N 10/00 |
| | | | 712/29 |
| 2014/0187427 A1* | 7/2014 | Macready | G06N 5/02 |
| | | | 505/170 |
| 2016/0283857 A1 | 9/2016 | Babbush et al. | |
| 2016/0314406 A1* | 10/2016 | Wiebe | G06N 10/00 |
| 2017/0351967 A1 | 12/2017 | Babbush et al. | |
| 2018/0096085 A1* | 4/2018 | Rubin | G06F 30/20 |
| 2018/0137422 A1 | 5/2018 | Wiebe et al. | |
| 2018/0165601 A1 | 6/2018 | Wiebe et al. | |
| 2018/0189653 A1 | 7/2018 | Burchard | |
| 2018/0232652 A1 | 8/2018 | Curtis et al. | |
| 2019/0164059 A1* | 5/2019 | Denchev | G06N 10/00 |
| 2019/0164079 A1* | 5/2019 | Gambetta | G06N 10/00 |
| 2019/0361675 A1* | 11/2019 | Haener | G06N 10/00 |
| 2019/0378033 A1* | 12/2019 | Figgatt | G06F 7/501 |
| 2020/0210755 A1* | 7/2020 | Luongo | G06K 9/6232 |

OTHER PUBLICATIONS

Martin Giles, "Running quantum algorithms in the cloud just got a lot faster", Sep. 2018, MIT Technology Review article, Cloud Computing, https://www.technologyreview.com/2018/09/07/66564/faster-quantum-computing-in-the-cloud/ (Year: 2018).*

Zhang, Gengyan, et al. "Suppression of photon shot noise dephasing in a tunable coupling superconducting qubit." arXiv:1603.01224v3 [quant-ph] Jan. 20, 2017. 5 pages.

Ahmadi, Hamed, et al. "Quantum Phase Estimation with Arbitrary Constant-precision Phase Shift Operators." arXiv:1012.4727v4 [quant-ph] Sep. 22, 2011. 14 pages.

Mell, Peter, et al. "The NIST Definition of Cloud Computing." National Institute of Standards and Technology. Sep. 2011. 7 pages.

"Qiskit Aqua—Building algorithms for near-term quantum applications." https://qiskit.org/aqua. Last Accessed Sep. 20, 2018. 7 pages.

* cited by examiner

QUANTUM ALGORITHM CONCATENATION

BACKGROUND

The subject disclosure relates to quantum algorithm concatenation, and more specifically, concatenating a plurality of quantum algorithms that can share one or more common components.

The field of quantum computing comprises a variety of quantum algorithms, which can run on one or more models of quantum computation (e.g., a quantum circuit model of computation). Quantum algorithms can be performed on a quantum computer and/or can be characterized by the use of a feature of quantum computation, such as quantum superposition and/or quantum entanglement.

Respective quantum algorithms can be designed to achieve specific analysis features. For example, quantum algorithms can be developed for use with a random initial trial state, wherein the quantum algorithms can rely on classical optimization iterations to achieve one or more results. In another example, quantum algorithms can be developed to achieve highly accurate results while minimizing dependency on classical operations. However, achievement of these analysis features can come with one or more disadvantages. For instance, quantum algorithms that utilize classical optimization iterations can take a substantially long time to execute. In another instance, quantum algorithms that minimize dependency on classical operations can require an accurate initial parameter to reach a highly accurate result. Thus, the use of a single quantum algorithm to address one or more computations can inherently comprise one or more drawbacks.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate concatenation of multiple quantum computing algorithms are described.

According to an embodiment, a system is provided. The system can comprise a memory that stores computer executable components. The system can also comprise a processor, operably coupled to the memory, and that executes the computer executable components stored in the memory. The computer executable components can comprise a concatenation component, operatively coupled to the processor, that can concatenate a first quantum algorithm and a second quantum algorithm by using an output of the first quantum algorithm as an initial parameter in the second quantum algorithm. An advantage of such a system can be the utilization of multiple quantum algorithms to solve a quantum computing problem.

In some examples, the system can concatenate the first quantum algorithm and the second quantum algorithm to perform a quantum phase estimation. An advantage of such a system can be the generation of a highly accurate quantum phase estimation within a runtime that is shorter than typical techniques.

According to an embodiment, a computer-implemented method is provided. The computer-implemented method can comprise concatenating, by a system operatively coupled to a processor, a first quantum algorithm and a second quantum algorithm by using an output of the first quantum algorithm as an initial parameter in the second quantum algorithm. An advantage of such a computer-implemented method can be that the inherent strengths of respective quantum algorithms can be aggregated to solve a quantum computing problem.

In some examples, the computer-implemented method can comprise terminating, by the system, an execution of the first quantum algorithm early to determine the output. An advantage of such a computer-implemented method can be a reduction in the runtime of the first quantum algorithm.

According to an embodiment, a computer program product for a quantum algorithm concatenation is provided. The computer program product can comprise a computer readable storage medium having program instructions embodied therewith. The program instructions can be executable by a processor to cause the processor to concatenate, by a system operatively coupled to the processor, a first quantum algorithm and a second quantum algorithm by using an output of the first quantum algorithm as an initial parameter in the second quantum algorithm. An advantage of such a computer program product can be that inherent limitations of respective quantum algorithms can be overcome by the function of one or more other concatenated quantum algorithms.

In some examples of the computer program product, the system can concatenate the first quantum algorithm and the second quantum algorithm in a cloud computing environment. An advantage of such an embodiment can be the utilization of multiple computing devices to expedite concatenation and/or calculation processes.

DETAILED DESCRIPTION

Figure 1:
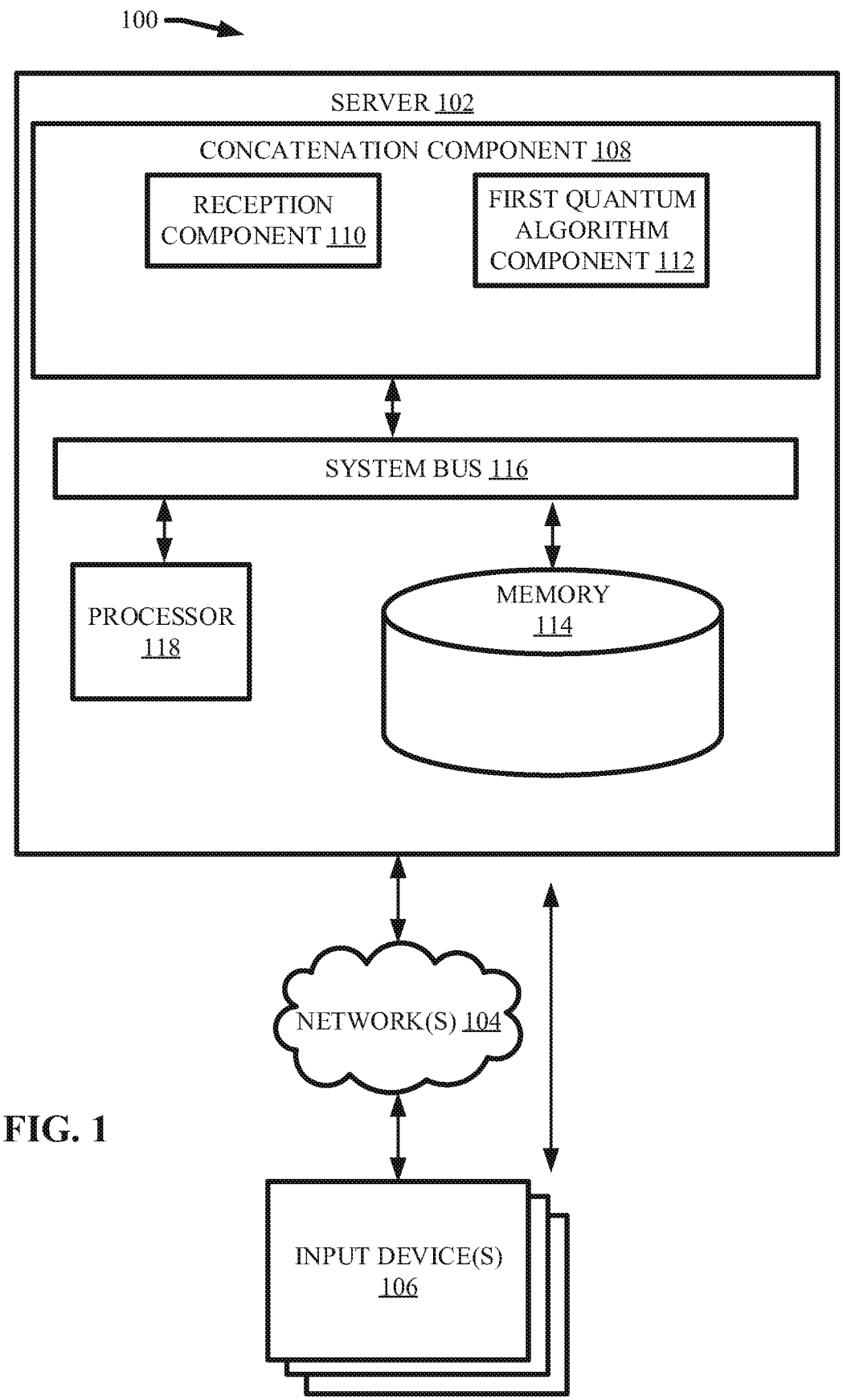
FIG. 1 illustrates a block diagram of an example, non-limiting system that can concatenate a plurality of quantum algorithms in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with the conventional quantum algorithms, the present disclosure can be implemented to produce a solution to one or more of these problems in the form of an autonomous concatenations of a plurality of quantum algorithms. For example, concatenation of multiple quantum algorithms can achieve the advantages of respective quantum algorithms while minimizing respective disadvantages of the individual quantum algorithms. Advantageously, through one or more concatenation processes, one or more outputs (e.g., byproducts) of a first quantum algorithm can be utilized to optimize the performance of a second quantum computing algorithm. Additionally, concatenation can facilitate in minimizing undesirable features typically experienced using single quantum algorithm by using the strengths of one quantum algorithm to compensate for the weaknesses of another quantum algorithm.

Various embodiments of the present invention can be directed to computer processing systems, computer-implemented methods, apparatus and/or computer program products that facilitate the efficient, effective, and autonomous (e.g., without direct human guidance) concatenation of a plurality of quantum algorithms. One or more embodiments can regard the use of a first quantum algorithm to generate one or more outputs that can then be utilized to improve the performance of a second quantum algorithm. For example, various embodiments can comprise identifying one or more common components of different quantum algorithms and arranging the executions of the quantum algorithms in a sequential order to facilitate concatenation.

The computer processing systems, computer-implemented methods, apparatus and/or computer program products employ hardware and/or software to solve problems that are highly technical in nature (e.g., the concatenation of multiple quantum algorithms), that are not abstract and cannot be performed as a set of mental acts by a human. For example, an individual, or a plurality of individuals, cannot readily perform one or more quantum algorithms as described herein. Even where a quantum algorithm utilizes one or more classical operations, a human cannot derive said operations with the level of effectiveness and/or efficiency that can be achieved by the computer processing systems, computer-implemented methods, and/or computer program products described herein.

FIG. 1 illustrates a block diagram of an example, non-limiting system 100 that can concatenate a plurality of quantum algorithms in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more input devices 106. The server 102 can comprise concatenation component 108. The concatenation component 108 can further comprise reception component 110 and/or first quantum algorithm component 112. Also, the server 102 can comprise or otherwise be associated with at least one memory 114. The server 102 can further comprise a system bus 116 that can couple to various components such as, but not limited to, the concatenation component 108 and associated components, memory 114 and/or a processor 118. While a server 102 is illustrated in FIG. 1, in other embodiments, multiple devices of various types can be associated with or comprise the features shown in FIG. 1. Further, the server 102 can communicate with one or more cloud computing environments via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the concatenation component 108 can be provided on the one or more servers 102, it should be appreciated that the architecture of system 100 is not so limited. For example, the concatenation component 108, or one or more components of concatenation component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the reception component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to: select one or more quantum algorithms for concatenation, provide one or more parameters to be analyzed via one or more quantum algorithms, input one or more quantum algorithms for concatenation, a combination thereof, and/or the like. Additionally, a user of the system 100 can utilize the one or more input devices 106 and/or one or more networks 104 to view one or more outputs generated from respective quantum algorithms and/or a concatenation of multiple quantum algorithms.

The reception component 110 can receive the data entered by a user of the system 100 via the one or more input devices 106. The reception component 110 can be operatively coupled to the one or more input devices 106 directly (e.g., via an electrical connection) or indirectly (e.g., via the one or more networks 104). Additionally, the reception component 110 can be operatively coupled to one or more components of the server 102 (e.g., one or more component associated with the concatenation component 108, system bus 116, processor 118, and/or memory 114) directly (e.g., via an electrical connection) or indirectly (e.g., via the one or more networks 104). In one or more embodiments, the one or more inputs (e.g., settings, commands, data, and/or selections) received by the reception component 110 can be communicated to the associate components of the concatenation component 108 (e.g., directly or indirectly) and/or can be stored in the memory 114 (e.g., located on the server 102 and/or within a cloud computing environment).

The first quantum algorithm component 112 can execute one or more first quantum algorithms. In one or more embodiments, the one or more first quantum algorithms can be stored in the memory 114, and the first quantum algorithm component 112 can select the one or more first quantum algorithms for execution based on an input received by the one or more input devices 106 and/or networks 104 (e.g., a user defined selection). In one or more embodiments, the one or more first quantum algorithms can be inputted into the system 100 via the one or more input devices 106 and/or the one or more networks 104. Additionally, the first quantum algorithm component 112 can run the one or more first quantum algorithms in accordance with one or more variables defined by a user of the system 100 (e.g., inputted into the system 100 via the one or more input devices 106 and/or networks 104).

In various embodiments, the one or more first quantum algorithms can be variational quantum algorithms and/or adiabatic quantum algorithms. Example first quantum algorithms can include, but are not limited to: a variational quantum Eigensolver ("VQE") algorithm, a variational quantum (k-)Eigensolver ("VQ(k)E") algorithm, a quantum adiabatic state preparation algorithm, a quantum preparation of gaussian states algorithm, a combination thereof, and/or the like. The one or more first quantum algorithms can be selected (e.g., by the first quantum algorithm component 112 and/or by a user of the system 100) based on one or more advantages provided by the subject quantum algorithm. For example, the first quantum algorithm component 112 can execute one or more VQ(k)E algorithms to take advantage of the VQ(k)E algorithms' ability to begin performance with a random initial trial state. For instance, an initial trial state can be randomly generated by the first quantum algorithm component 112 to begin execution of the one or more VQ(k)E algorithms, and/or a random initial trial state can be received by the concatenation component 108 (e.g., via the one or more input devices 106 and/or the one or more networks 104).

By executing the one or more first quantum algorithms, the first quantum algorithm component 112 can determine one or more outputs. The one or more outputs can be results achieved by the one or more first quantum algorithms and/or one or more by-products developed to achieve the results, such as one or more parameters developed through one or more evolutions of the one or more first quantum algorithms. For example, wherein the one or more first quantum algorithms are VQ(k)E algorithms, one or more quantum state wave functions can be evolved through the execution of the subject quantum algorithm. For instance, a VQ(k)E algorithm executed by the first quantum algorithm component 112 can evolve a quantum state wave function to approach the Eigenvector corresponding to the target Eigenvalue via a quantum subroutine run inside of a classical optimization loop. In various embodiments, one or more of the outputs (e.g., a by-product such as a parameterized quantum state wave function) determined by the first quantum algorithm component 112 can be a common component in one or more second algorithms executed later in the concatenation processes facilitated by the concatenation component 108.

In one or more embodiments, the one or more outputs can be determined by the first quantum algorithm component 112 prior to a complete processing of the subject one or more first quantum algorithms. For example, the first quantum algorithm component 112 can determine one or more desired outputs (e.g., one or more parameterized quantum state wave functions) during execution of the one or more first quantum algorithms and subsequently perform an early termination of the execution. The early termination point enforced by the first quantum algorithm component 112 can be determined based on one or more factors, which can include, but are not limited to: a user defined maximum number of iterations, a tolerance of inaccuracy, a convergence criteria, a combination thereof, and/or the like. For instance, wherein the one or more first quantum algorithms are VQ(k)E algorithms, a parameterized quantum state wave function can be developed during execution of the subject algorithms but prior to completion of the classical optimization loop. Therefore, the first quantum algorithm component 112 can terminate execution of the VQ(k)E algorithm early and/or utilize the last evolved version of the quantum state wave function as an output to be utilized in a concatenation process (e.g., as a common component to facilitate concatenation).

In one or more embodiments, the first quantum algorithm component 112 can minimize one or more disadvantages inherent in the one or more first quantum algorithms by focusing on a determination of the one or more outputs (e.g., common components of concatenation) rather than the conventional results achieved by the subject quantum algorithms. For example, wherein the one or more first quantum algorithms are VQ(k)E algorithms, a disadvantage of the subject quantum algorithms can be the substantial run time necessitated to complete a full execution of the quantum algorithm (e.g., complete the optimization loop). However, the first quantum algorithm component 112 can reduce the run time and thereby minimize the VQ(k)E algorithm's disadvantage by terminating the VQ(k)E early. By performing an early termination, the first quantum algorithm component 112 can determine one or more outputs (e.g., one or more evolutions of a parameterized quantum state wave function) while minimizing one or more disadvantages (e.g., minimizing the run time) of the VQ(k)E algorithm.

Figure 2:
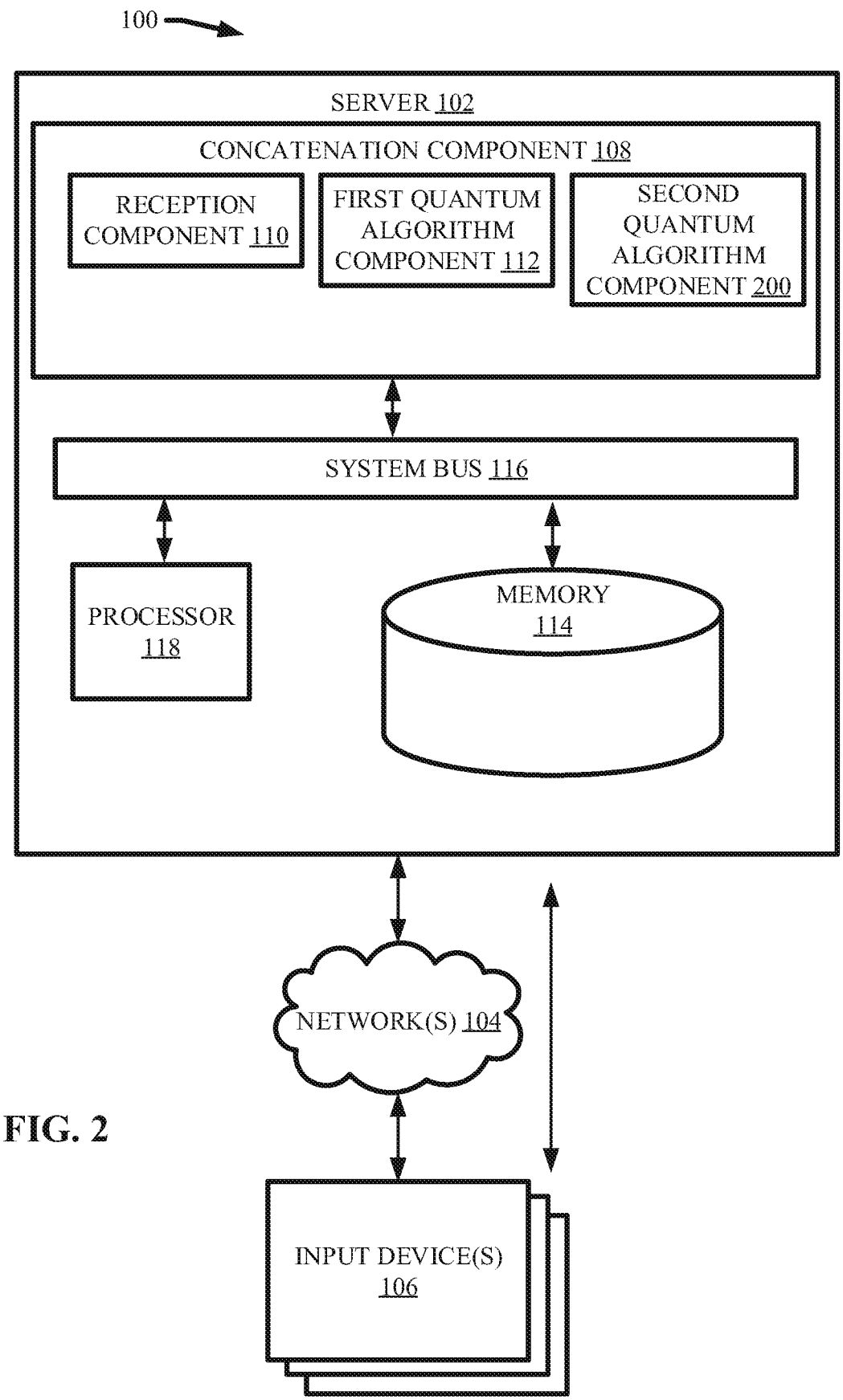
FIG. 2 illustrates a block diagram of an example, non-limiting system that can concatenate a plurality of quantum algorithms in accordance with one or more embodiments described herein.

FIG. 2 illustrates another diagram of the example, non-limiting system 100 further comprising a second quantum algorithm component 200 in accordance with one or more embodiments described herein. Repetitive description of like elements employed in other embodiments described herein is omitted for sake of brevity. The second quantum algorithm component 200 can facilitate in concatenating the one or more first quantum algorithms with one or more second quantum algorithms.

In various embodiments, the second quantum algorithm component 200 can execute one or more second quantum algorithms based on the one or more outputs determined by the first quantum algorithm component 112. The one or more outputs determined by the first quantum algorithm component 112 can be stored in the memory 114 and thereby retrieved by the second quantum algorithm component 200. Additionally, and/or alternatively, the second quantum algorithm component 200 can receive the one or more outputs from the first quantum algorithm component 112 directly (e.g., via electrical connection) and/or indirectly (e.g., via the one or more networks 104).

The one or more second quantum algorithms can be stored in the memory 114, and the second quantum algorithm component 200 can select the one or more second quantum algorithms for execution based on an input received by the one or more input devices 106 and/or networks 104 (e.g., a user defined selection). In one or more embodiments, the one or more second quantum algorithms can be inputted into the system 100 via the one or more input devices 106 and/or the one or more networks 104. Additionally, the second quantum algorithm component 200 can run the one or more second quantum algorithms in accordance with one or more variables defined by a user of the system 100 (e.g., inputted into the system 100 via the one or more input devices 106 and/or networks 104).

The one or more second quantum algorithms can be one or more quantum algorithms that are distinct from the one or more first quantum algorithms. Example second quantum algorithms can include, but are not limited to: quantum phase estimation ("QPE") algorithms, (iterative) quantum phase estimation ("(i)QPE") algorithms, approximate quantum phase estimation ("aQPE") algorithms, a combination thereof, and/or the like. In one or more embodiments, the one or more second quantum algorithms can be selected (e.g., by the second quantum algorithm component 200 and/or a user of the system 100) based on one or more strengths of the second quantum algorithms and/or one or more common components with the one or more first quantum algorithms. For example, the second quantum algorithm component 200 can execute one or more (i)QPE algorithms to take advantage of the algorithms' high level of accuracy and/or minimal dependency on classical operations. Additionally, wherein the first quantum algorithm component 112 executes a VQ(k)E algorithm, the second quantum algorithm component 200 can execute one or more (i)QPE algorithms to utilize one or more common components between the two algorithms, such as the use of a quantum state wave function.

In various embodiments, the second quantum algorithm component 200 can utilize the one or more outputs determined by the first quantum algorithm component 112 to execute the one or more second quantum algorithms. For example, the second quantum algorithm component 200 can utilize the one or more outputs to develop an initial trial state to begin execution of the one or more second quantum algorithms. For instance, wherein the first quantum algorithm component 112 executes one or more VQ(k)E algorithms and determines one or more parameterized quantum state wave functions, the second quantum algorithm component 200 can use the parameterized quantum state wave functions as an initial state of analysis by the one or more second quantum algorithms (e.g., (i)QPE algorithms). Thus, the second quantum algorithm component 200 can substitute the one or more outputs determined by the first quantum algorithm component 112 with one or more common components of the one or more second quantum algorithms to facilitate execution of the one or more second quantum algorithms.

Additionally, in various embodiments the second quantum algorithm component 200 can minimize one or more disadvantages inherent to the one or more second quantum algorithms by utilizing the one or more outputs of the first quantum algorithm component 112 as a common component in the execution of the one or more second quantum algorithm components. For example, wherein the one or more second quantum algorithms are (i)QPE algorithms, a disadvantage of the subject quantum algorithms can be that the accuracy of the results achieved by the (i)QPE algorithms can be dependent on the quality of initial parameters selected to develop an initial state of analysis (e.g., accuracy of the result can depend on a proximity between the result and the initial state utilized to begin execution of the algorithm). For instance, random initial trial states can lead to inaccurate results achieved by the (i)QPE algorithm. Thus, the enhanced accuracy capabilities of the (i)QPE algorithm can be difficult to realize where one or more initial state parameters are unknown. However, the disadvantages of the (i)QPE algorithms can be minimized by utilizing the one or more outputs of the first quantum algorithm component 112 to delineate an initial state for execution, wherein the one or more first quantum algorithms (e.g., VQ(k)E, VQE, and/or adiabatic algorithms) can develop one or more initial state parameters (e.g., parameterized quantum state wave functions) from random values. By utilizing the one or more outputs determined by the first quantum algorithm component 112 as one or more initial parameters for execution of the one or more second quantum algorithms, the second quantum algorithm component 200 can overcome one or more inherent disadvantages of the one or more second quantum algorithms and achieve one or more accurate results. Additionally, the second quantum algorithm component 200 can send one or more results generated by the execution of the one or more second quantum algorithms to the one or more input devices 106 (e.g., directly and/or via the one or more networks 104) for review by a user of the system 100.

For instance, in exemplary embodiment described to articulate one or more of the features described herein, the first quantum algorithm component 112 can execute a VQ(k)E algorithm with a random initial trial state. Subsequently, the first quantum algorithm component 112 can perform an early termination of the execution of the VQ(k)E algorithm. During the shortened execution of the VQ(k)E algorithm, the first quantum algorithm component 112 can determine one or more parameterized quantum state wave functions that can serve as common components for concatenation with one or more second quantum algorithms. The second quantum algorithm component 200 can utilized the parameterized quantum state wave functions to prepare an initial state for the execution of a (i)QPE algorithm. Additionally, the second quantum algorithm component 200 can execute the prepared (i)QPE algorithm (e.g., based on the parameterized quantum state wave function developed by the VQ(k)E algorithm) to generate a quantum phase estimation. One of ordinary skill in the art will recognize that the various embodiments described herein are not limited to the quantum algorithms and/or common components of the quantum algorithms described with regards to this exemplary embodiment. Rather, the principals delineated through the description of this exemplary embodiment are applicable to a variety of quantum algorithms and/or common components (e.g., outputs) as described herein.

Figure 3:
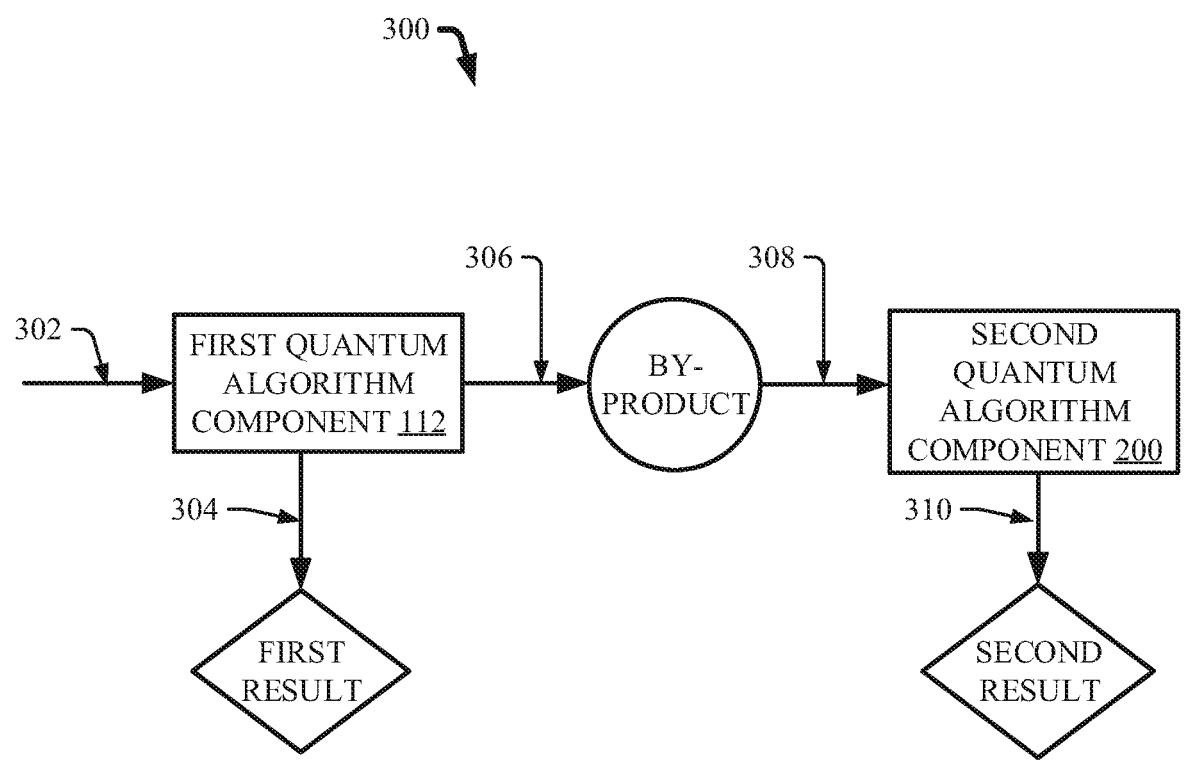
FIG. 3 illustrates a flow diagram of an example, non-limiting concatenation processes that can facilitate an autonomous concatenation of a plurality of quantum algorithms in accordance with one or more embodiments described herein.

FIG. 3 illustrates a diagram of an example, non-limiting concatenation process 300 that can be performed by the concatenation component 108 in accordance with one or more embodiments described herein. Repetitive description of like elements employed in other embodiments described herein is omitted for sake of brevity.

At 302 of the concatenation process 300, the concatenation component 108 can receive one or more inputs. For instance, the one or more inputs can be generated by a user of the system 100 via the one or more input devices 106. Example inputs can include, but are not limited to: target problem configurations, termination and/or convergence criteria for subject quantum algorithms, a combination thereof, and/or the like.

At 304 of the concatenation process 300, the first quantum algorithm component 112 can execute one or more first quantum algorithms based on the received inputs to generate one or more first results. In one or more embodiments, the execution of the one or more first quantum algorithms can be a shortened execution, wherein the first quantum algorithm component 112 can perform an early termination of the one or more first quantum algorithms.

At 306 of the concatenation process 300, the first quantum algorithm component 112 can determine one or more by-products developed during the execution (e.g., shortened execution) of the one or more first quantum algorithms. The one or more by-products can be common components shared by the one or more first quantum algorithms executed by the first quantum algorithm component 112 and/or one or more second quantum algorithms to be executed by the second quantum algorithm component 200. For example, the one or more by-products can be one or more parameterized quantum wave functions (e.g., parameterized for an Eigenvector).

At 308 of the concatenation process 300, the first quantum algorithm component 112 can output the one or more by-products to the second quantum algorithm component 200. For example, the first quantum algorithm component 112 can output the one or more by-products through a direct electrical connection and/or via one or more networks 104.

At 310 of the concatenation process 300, the second quantum algorithm component 200 can execute one or more second quantum algorithms utilizing the one or more by-products to generate one or more second results. For example, the one or more by-products can be utilized by the second quantum algorithm component 200 to prepare an initial state for execution of the one or more second quantum algorithms. In various embodiments, the second result can be more accurate than the first result.

Figure 4:
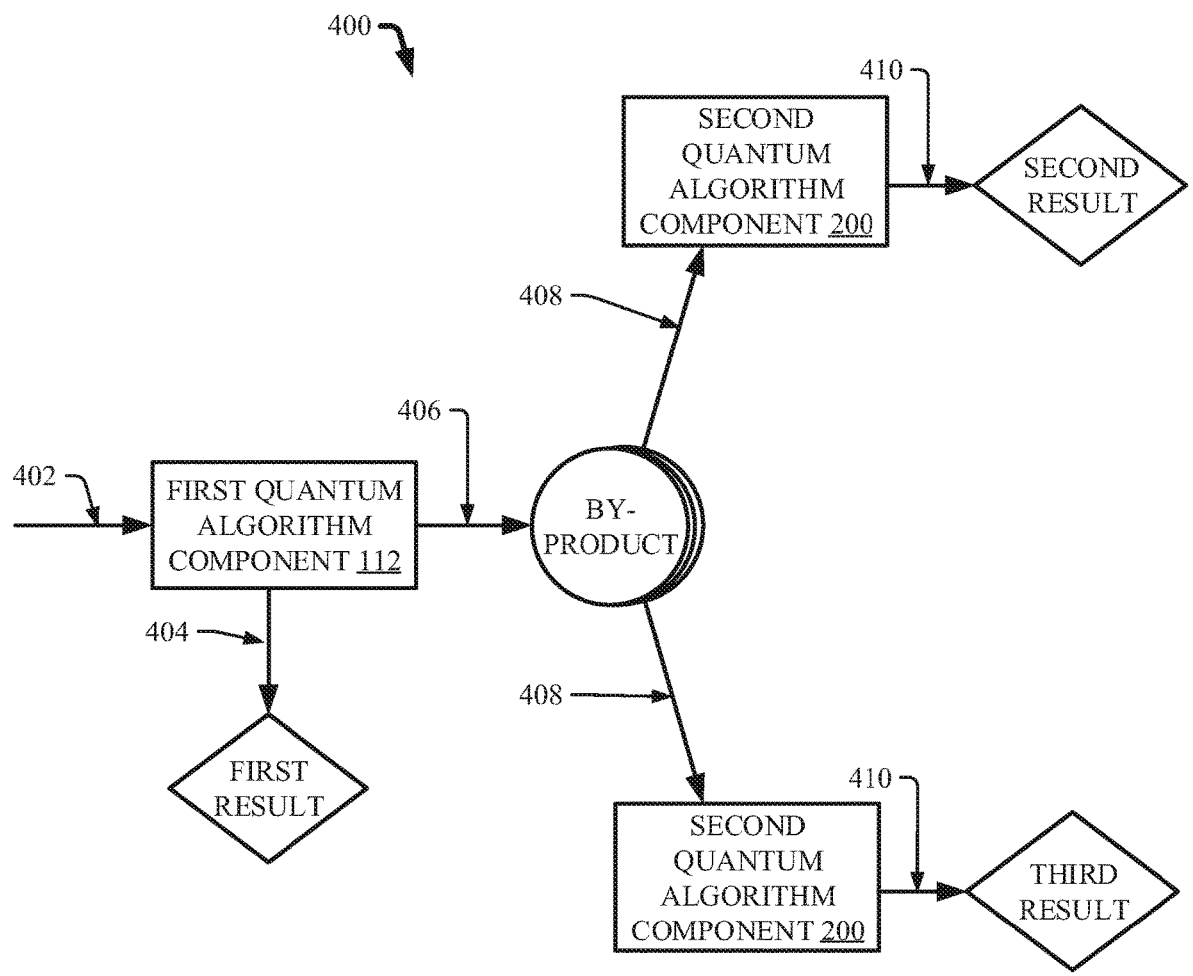
FIG. 4 illustrates a flow diagram of an example, non-limiting concatenation processes that can facilitate an autonomous concatenation of a plurality of quantum algorithms in accordance with one or more embodiments described herein.

FIG. 4 illustrates a diagram of an example, non-limiting concatenation process 400 that can be performed by the concatenation component 108 in accordance with one or more embodiments described herein. Repetitive description of like elements employed in other embodiments described herein is omitted for sake of brevity.

At 402 of the concatenation process 400, the concatenation component 108 can receive one or more inputs. For instance, the one or more inputs can be generated by a user of the system 100 via the one or more input devices 106. Example inputs can include, but are not limited to: target problem configurations, termination and/or convergence criteria for subject quantum algorithms, a combination thereof, and/or the like.

At 404 of the concatenation process 400, the first quantum algorithm component 112 can execute one or more first quantum algorithms based on the received inputs to generate one or more first results. In one or more embodiments, the execution of the one or more first quantum algorithms can be a shortened execution, wherein the first quantum algorithm component 112 can perform an early termination of the one or more first quantum algorithms.

At 406 of the concatenation process 400, the first quantum algorithm component 112 can determine one or more by-products developed during the execution (e.g., shortened execution) of the one or more first quantum algorithms. The one or more by-products can be common components shared by the one or more first quantum algorithms executed by the first quantum algorithm component 112 and/or one or more second quantum algorithms to be executed by the second quantum algorithm component 200. For example, the one or more by-products can be one or more parameterized quantum wave functions (e.g., parameterized for an Eigenvector).

At 408 of the concatenation process 400, the first quantum algorithm component 112 can output the one or more by-products to a plurality of second quantum algorithm components 200. For example, the first quantum algorithm component 112 can output the one or more by-products through a direct electrical connection and/or via one or more networks 104. In one or more embodiments, the first quantum algorithm component 112 can output respect by-products to respective second quantum algorithm components 200, which can execute the same one or more second quantum algorithms. In one or more embodiments, the first quantum algorithm component 112 can output the same by-products to respective second quantum algorithm components 200 that can run respective second quantum algorithms. In one or more embodiments, the first quantum algorithm component 112 can output respective by-products to respective second quantum algorithm components 200 that can run respective second quantum algorithms.

At 410 of the concatenation process 400, the respective second quantum algorithm component 200 can execute one or more second quantum algorithms utilizing the one or more by-products to generate one or more respective second results. For example, the one or more by-products can be utilized by the respective second quantum algorithm component 200 to prepare one or more initial state for execution of the one or more second quantum algorithms. In various embodiments, the respective second results can be more accurate than the first result.

Figure 5:
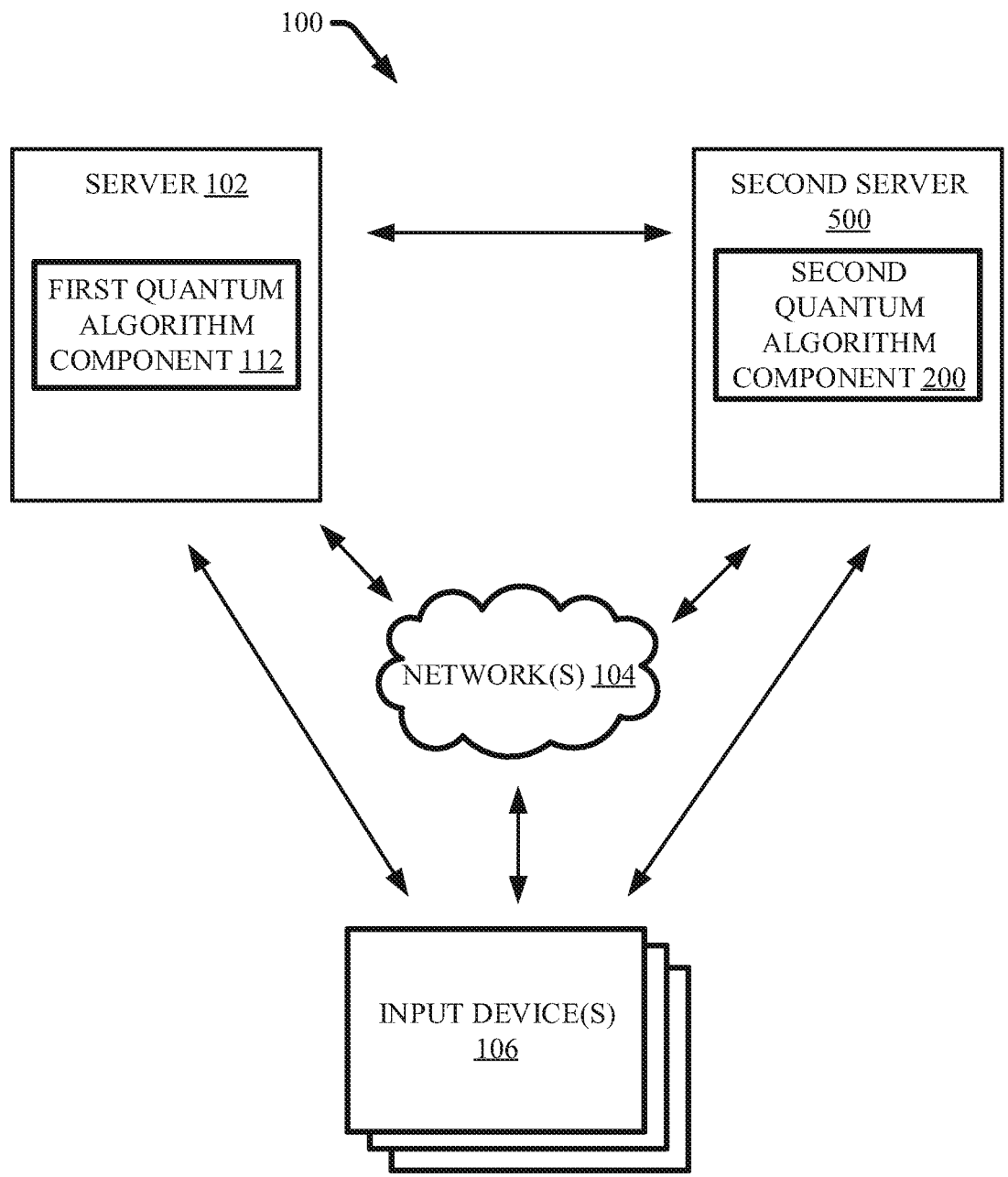
FIG. 5 illustrates a block diagram of an example, non-limiting system that can concatenate a plurality of quantum algorithms in accordance with one or more embodiments described herein.

FIG. 5 illustrates a diagram of the example, non-limiting system 100 comprising a second server 500 in accordance with one or more embodiments described herein. Repetitive description of like elements employed in other embodiments described herein is omitted for sake of brevity. FIG. 5 exemplifies that one or more concatenation operations can be performed by a plurality of servers working in conjunction with each other.

The second server 500 can comprise the same components and/or can perform the same features as the server 102. As depicted in FIG. 5, one or more outputs and/or determinations formed at a first server (e.g., server 102) can be shared with one or more other servers (e.g., second server 500) to facilitate concatenation of multiple quantum algorithms at an expedited rate. For example, one or more outputs (e.g., common components such as a parameterized quantum state wave function) determined by a first quantum algorithm component 112 comprised within a first server (e.g., server 102) can be outputted (e.g., via a direct electrical connection and/or via the one or more networks 104) to a second quantum algorithm component 200 comprised within another server (e.g., server 500). By sharing the computation workload across multiple servers (e.g., server 102 and/or one or more second servers 500), the system 100 can expedite one or more concatenation processes and/or the generation of one or more results.

Figure 6:
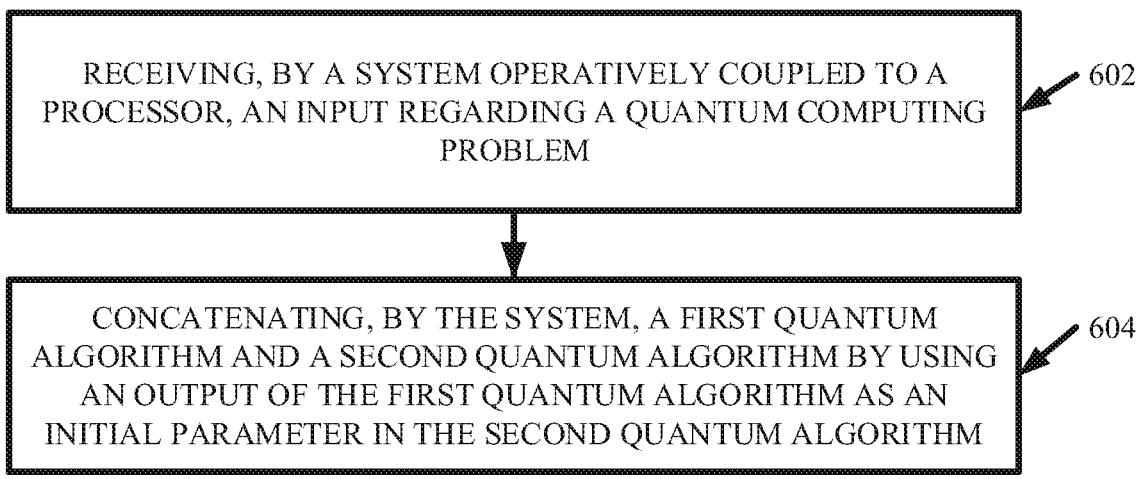
FIG. 6 illustrates a flow diagram of an example, non-limiting method that can facilitate an autonomous concatenation of a plurality of quantum algorithms in accordance with one or more embodiments described herein.

FIG. 6 illustrates a flow diagram of an example, non-limiting method 600 that can be implemented by the system 100 to facilitate the concatenation of a plurality of quantum algorithms in accordance with one or more embodiments described herein.

At 602, the method 600 can comprise receiving, by a system 100 (e.g., via the reception component 110 and/or the one or more networks 104) operatively coupled to a processor 118, one or more inputs regarding one or more quantum computing problems (e.g., a problem that can be solved through the implementation of quantum computing techniques). In one or more embodiments, a user of the system 100 can enter the one or more inputs via one or more input devices 106. Example inputs that can be received at 602 can include, but are not limited to: target problem configurations, termination and/or convergence criteria for subject quantum algorithms, a combination thereof, and/or the like.

At 604, the method 600 can comprise concatenating, by the system 100 (e.g., via the concatenation component 108), one or more first quantum algorithms and one or more second quantum algorithms by using one or more outputs of the one or more first quantum algorithms as one or more initial parameters in the one or more second quantum algorithms. Example first quantum algorithms can include, but are not limited to: VQE algorithms, VQ(k)E algorithms, adiabatic algorithms, a quantum adiabatic state preparation algorithm, a quantum preparation of gaussian states algorithm, a combination thereof, and/or the like. Example second quantum algorithms can include, but are not limited to: QPE algorithms, (i)QPE algorithms, aQPE, a combination thereof, and/or the like. The one or more outputs can be one or more by-products (e.g., parameterized quantum state wave functions) developed during the execution of the one or more first quantum algorithms. Additionally, the one or more outputs can regard common components shared between the quantum algorithms subject to concatenation.

In various embodiments, the concatenation at 604 can comprise performing (e.g., via the first quantum algorithm component 112) a shortened execution of the one or more first quantum algorithms via an early termination procedure. For example, an early termination enforced by the first quantum algorithm component 112 can be determined based on one or more factors, which can include, but are not limited to: a user defined maximum number of iterations, a tolerance of inaccuracy, convergence criteria, a combination thereof, and/or the like. Additionally, in one or more embodiments, the concatenation at 604 can comprise preparing (e.g., via the second quantum algorithm component 200) an initial state for the one or more second quantum algorithms with the one or more outputs. Advantageously, the concatenation facilitated by method 600 can combine one or more advantages (e.g., enhanced accuracy) of respective quantum algorithms to solve the quantum computing problem.

Figure 7:
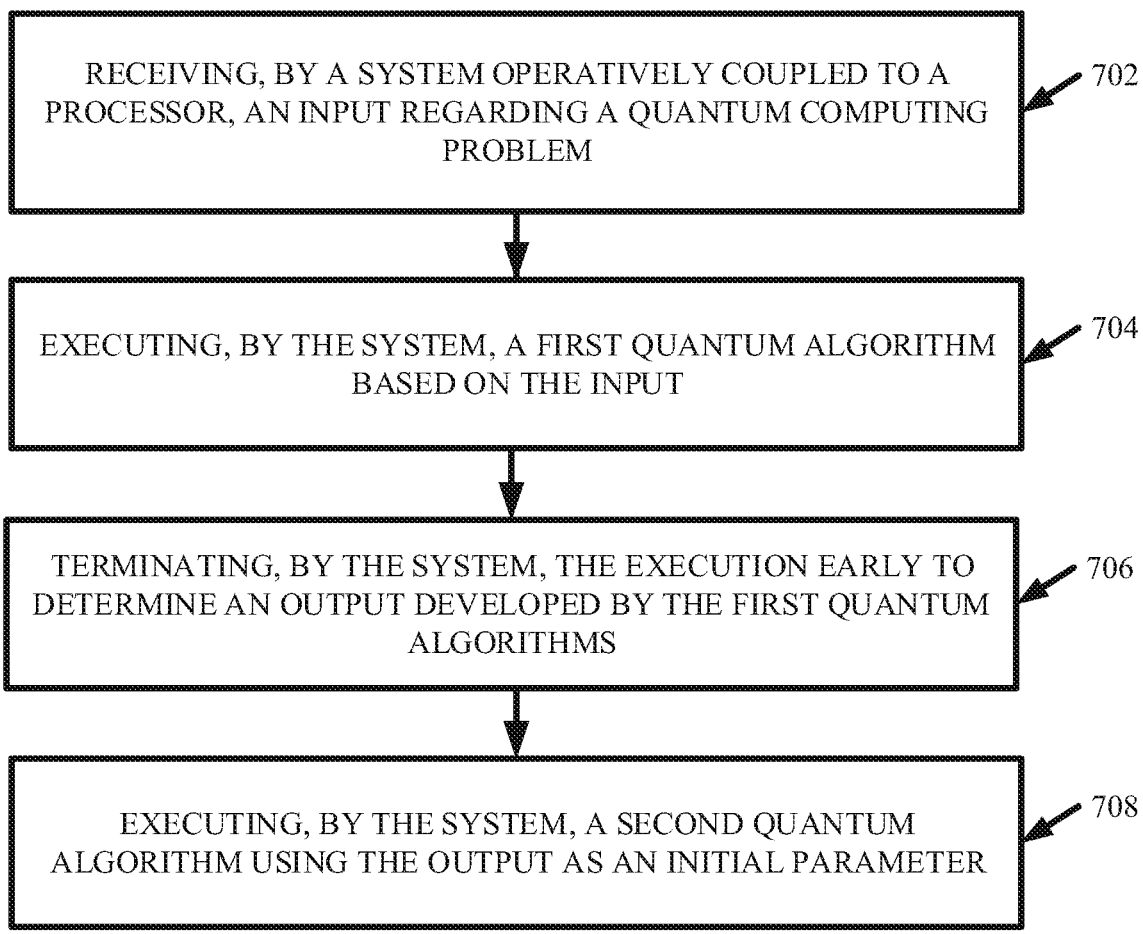
FIG. 7 illustrates a flow diagram of an example, non-limiting method that can facilitate an autonomous concatenation of a plurality of quantum algorithms in accordance with one or more embodiments described herein.

FIG. 7 illustrates a flow diagram of an example, non-limiting method 700 that can be implemented by the system 100 to facilitate the concatenation of a plurality of quantum algorithms in accordance with one or more embodiments described herein.

At 702, the method 700 can comprise receiving, by a system 100 (e.g., via the reception component 110 and/or the one or more networks 104) operatively coupled to a processor 118, one or more inputs regarding one or more quantum computing problems (e.g., a problem that can be solved through the implementation of quantum computing techniques). In one or more embodiments, a user of the system 100 can enter the one or more inputs via one or more input devices 106. Example inputs that can be received at 702 can include, but are not limited to: target problem configurations, termination and/or convergence criteria for subject quantum algorithms, a combination thereof, and/or the like.

At 704, the method 700 can comprise executing, by the system 100 (e.g., via the first quantum algorithm component 112), one or more first quantum algorithms based on the one or more inputs received at 702. Example first quantum algorithms can include, but are not limited to: VQE algorithms, VQ(k)E algorithms, adiabatic algorithms, a quantum adiabatic state preparation algorithm, a quantum preparation of gaussian states algorithm, a combination thereof, and/or the like.

At 706, the method 700 can comprise terminating, by the system 100 (e.g., via the first quantum algorithm component 112), the execution of 704 early to determine an output developed by the one or more first quantum algorithms. The terminating at 706 can be influenced by one or more factors, including, but not limited to: a user defined maximum number of iterations, a tolerance of inaccuracy, convergence criteria, a combination thereof, and/or the like. The one or more outputs can be one or more by-products developed during the execution of the one or more first quantum algorithms. Additionally, the one or more outputs can regard common components shared between the quantum algorithms subject to concatenation. An example output that can be developed by the one or more first quantum algorithms during the shortened execution can be one or more parameterized quantum state wave functions (e.g., parameterized for an Eigenvector).

At 708, the method 700 can comprise executing, by the system 100 (e.g., via the second quantum algorithm component 200), one or more second quantum algorithms using the output as one or more initial parameters. Example second quantum algorithms can include, but are not limited to: QPE algorithms, (i)QPE algorithms, aQPE, a combination thereof, and/or the like. In one or more embodiments, the executing at 708 can comprise preparing (e.g., via the second quantum algorithm component 200) an initial state with the one or more outputs to facilitate exaction of the one or more second quantum algorithms. Advantageously, the concatenation facilitated by method 700 can minimize one or more inherent disadvantages (e.g., long run time) of respective quantum algorithms while generating a solution to the quantum computing problem.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
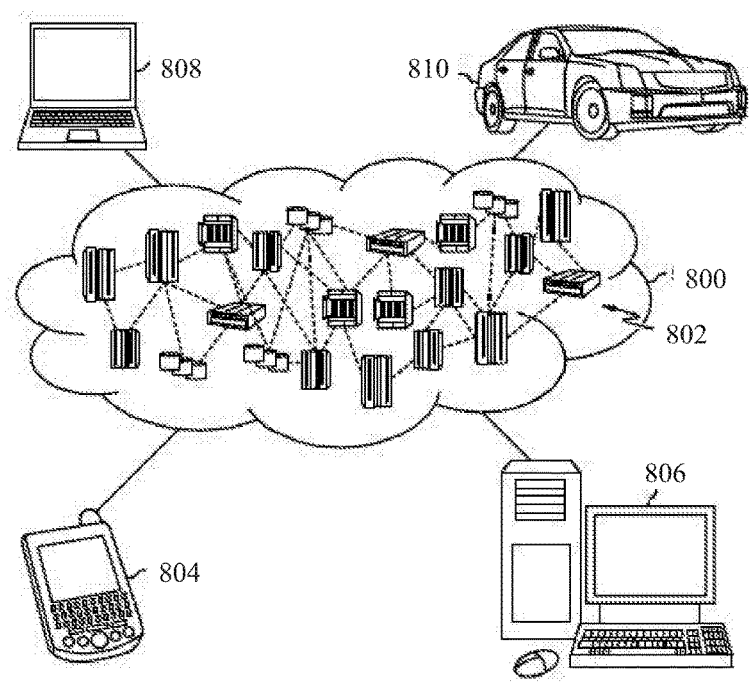
FIG. 8 depicts a cloud computing environment in accordance with one or more embodiments described herein.

Referring now to FIG. 8, illustrative cloud computing environment 800 is depicted. As shown, cloud computing environment 800 includes one or more cloud computing nodes 802 with which local computing devices used by cloud consumers, such as, for example, personal digital assistant (PDA) or cellular telephone 804, desktop computer 806, laptop computer 808, and/or automobile computer system 810 may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-810 shown in FIG. 8 are intended to be illustrative only and that computing nodes 802 and cloud computing environment 800 can communicate with any type of computerized device over any type of network and/or network addressable connection (e.g., using a web browser).

Figure 9:
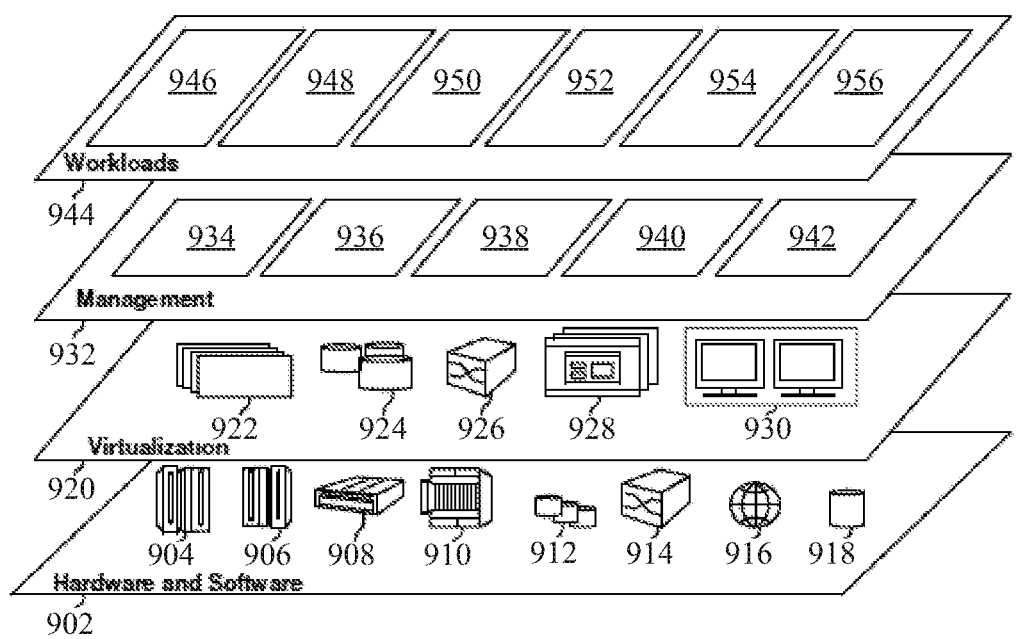
FIG. 9 depicts abstraction model layers in accordance with one or more embodiments described herein

Referring now to FIG. 9, a set of functional abstraction layers provided by cloud computing environment 800 (FIG. 8) is shown. Repetitive description of like elements employed in other embodiments described herein is omitted for sake of brevity. It should be understood in advance that the components, layers, and functions shown in FIG. 9 are intended to be illustrative only and embodiments of the invention are not limited thereto. As depicted, the following layers and corresponding functions are provided.

Hardware and software layer 902 includes hardware and software components. Examples of hardware components include: mainframes 904; RISC (Reduced Instruction Set Computer) architecture based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and quantum algorithm concatenation 956. Various embodiments of the present invention can utilize the cloud computing environment described with reference to FIGS. 8 and 9 to concatenate a plurality of quantum algorithms.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 10:
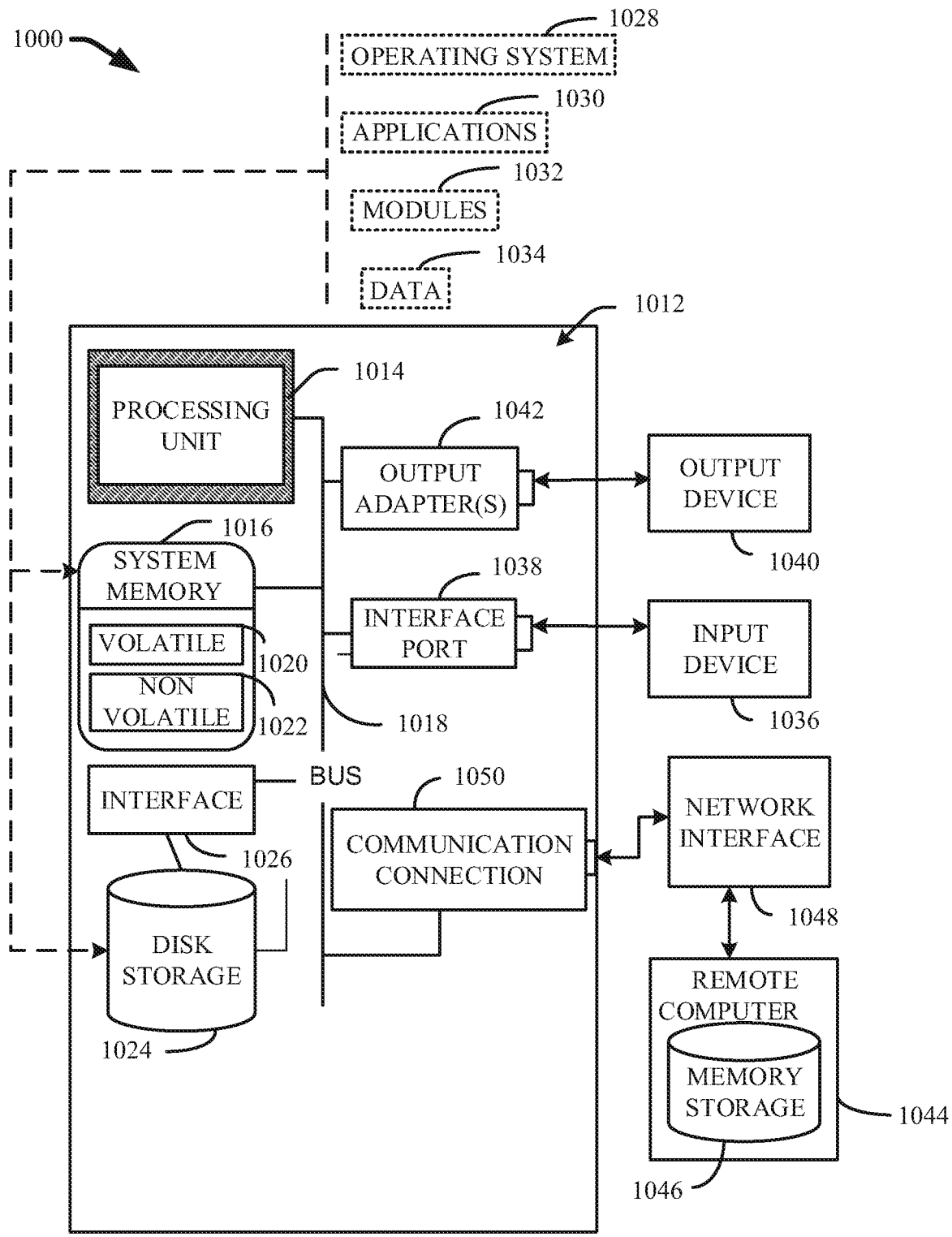
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor, operably coupled to the memory, and that executes the computer executable components stored in the memory, wherein the computer executable components comprise:
   a concatenation component, operatively coupled to the processor, that concatenates a first quantum algorithm and a second quantum algorithm by using an output of the first quantum algorithm as an initial parameter in the second quantum algorithm, wherein, prior to concatenation, the output of the first quantum algorithm is selected as the initial parameter for the second quantum algorithm based on a determination that output is a common component in the second quantum algorithm, and wherein the output is a by-product generated during execution of the first quantum algorithm and wherein the output is a parameterized quantum state wave function.

2. The system of claim 1, wherein the concatenation component concatenates the first quantum algorithm and the second quantum algorithm and performs a quantum phase estimation.

3. The system of claim 1, wherein the first quantum algorithm is an algorithm selected from a group consisting of a variational quantum algorithm and an adiabatic quantum algorithm.

4. The system of claim 3, wherein the second quantum algorithm is a quantum phase estimation algorithm.

5. The system of claim 4, wherein the second quantum algorithm is an iterative quantum phase estimation.

6. The system of claim 1, wherein the computer executable components further comprise:
   a first quantum algorithm component, operatively coupled to the processor, that executes the first quantum algorithm and determines the output.

7. The system of claim 6, wherein the computer executable components further comprise:
   a second quantum algorithm component, operatively coupled to the processor, that executes the second quantum algorithm using the output as the initial parameter.

8. The system of claim 7, wherein the first quantum algorithm component performs an early termination of the first quantum algorithm to determine the output, and wherein the early termination is determined based on a defined tolerance of inaccuracy.

9. The system of claim 8, wherein the output is a quantum state wave function.

10. The system of claim 9, wherein the initial parameter is an initial state of the second quantum algorithm, and wherein the second quantum algorithm is a quantum phase estimation algorithm.

11. A computer-implemented method, comprising:
    concatenating, by a system operatively coupled to a processor, a first quantum algorithm and a second quantum algorithm by using an output of the first quantum algorithm as an initial parameter in the second quantum algorithm, wherein, prior to the concatenating, the output of the first quantum algorithm is selected as the initial parameter for the second quantum algorithm based on a determination that output is a common component in the second quantum algorithm.

12. The computer-implemented method of claim 11, wherein the first quantum algorithm is an algorithm selected from a group consisting of a variational quantum algorithm and an adiabatic quantum algorithm.

13. The computer-implemented method of claim 12, further comprising:
    terminating, by the system, an execution of the first quantum algorithm early to determine the output, wherein the terminating early is based on a user defined maximum number of iterations.

14. The computer-implemented method of claim 13, wherein the output is a quantum state wave function.

15. The computer-implemented method of claim 14, wherein the initial parameter is an initial state of the second quantum algorithm, and wherein the second quantum algorithm is a quantum phase estimation algorithm.

16. A computer program product for a quantum algorithm concatenation, the computer program product comprising a computer readable storage medium having program instructions embodied therewith, the program instructions executable by a processor to cause the processor to:
    concatenate, by a system operatively coupled to the processor, a first quantum algorithm and a second quantum algorithm by using an output of the first quantum algorithm as an initial parameter in the second quantum algorithm, wherein, prior to concatenation, the output of the first quantum algorithm is selected as the initial parameter for the second quantum algorithm based on a determination that output is a common component in the second quantum algorithm, and wherein the output is a parameterized quantum state wave function.

17. The computer program product of claim 16, wherein the program instructions further cause the processor to:
initialize, by the system, an execution of the first quantum algorithm, wherein the first quantum algorithm is an algorithm selected from a group consisting of a variational quantum algorithm and an adiabatic quantum algorithm.

18. The computer program product of claim 17, wherein the program instructions further cause the processor to:
stopping, by the system, the execution of the first quantum algorithm at an early termination point to determine the output, wherein the output is a quantum state wave function developed during the execution of the first quantum algorithm.

19. The computer program product of claim 18, wherein the program instructions further cause the processor to:
execute, by the system, the second quantum algorithm using the quantum state wave function as the initial parameter, wherein the second quantum algorithm is a quantum phase estimation algorithm.

20. The computer program product of claim 16, wherein the system concatenates the first quantum algorithm and the second quantum algorithm in a cloud computing environment.

* * * * *